M. F. BELL.
FOOT REST.
APPLICATION FILED JAN. 23, 1917.

1,270,103.

Patented June 18, 1918.

WITNESSES

INVENTOR
Morris F. Bell.
BY Victor J. Evans
ATTORNEY

UNITED STATES PATENT OFFICE.

MORRIS F. BELL, OF FULTON, MISSOURI.

FOOT-REST.

1,270,103.  Specification of Letters Patent.  Patented June 18, 1918.

Application filed January 23, 1917. Serial No. 143,984.

*To all whom it may concern:*

Be it known that I, MORRIS F. BELL, a citizen of the United States, residing at Fulton, in the county of Callaway and State of Missouri, have invented new and useful Improvements in Foot-Rests, of which the following is a specification.

It is a well known fact, that the floor of an automobile in advance of the front seat, becomes at times very hot, due to the heat from the engine, especially during the warm season of the year, and those occupying the front seat of the vehicle find the conditions very uncomfortable to their feet.

It is therefore the chief characteristic of my invention to provide a foot rest for motor vehicles, possessing heat resisting qualities, thus preventing the feet of those occupying the front seat from becoming uncomfortably warm.

In carrying out the invention I also provide means whereby the foot rest can be quickly attached to or removed from the floor of the vehicle, and when attached held in position to the comfort of the user.

The invention further embodies the desired features of simplicity in construction, with a view of reducing the cost of manufacture and sale of the article to a minimum.

The nature and advantages of the invention will be better understood from the following description when read in connection with the accompanying drawing, the invention residing in the construction, combination and arrangement of parts as claimed.

In the drawing forming part of this specification like numerals of reference indicate similar parts in the several views and wherein:—

Figure 1:
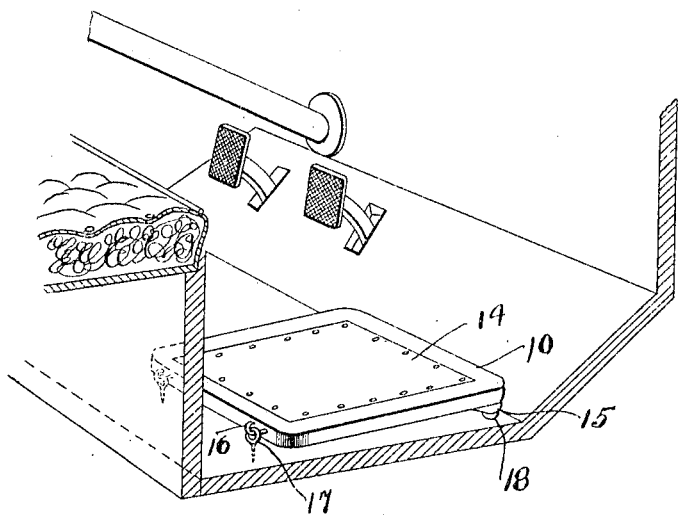
Figure 1 is a perspective view of the foot rest constructed in accordance with my invention.
Figure 2:
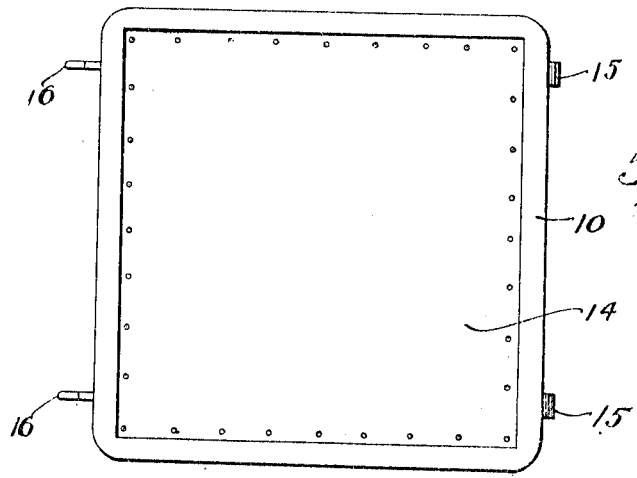
Fig. 2 is a plan view showing the manner of associating the foot rest with the floor.
Figure 3:
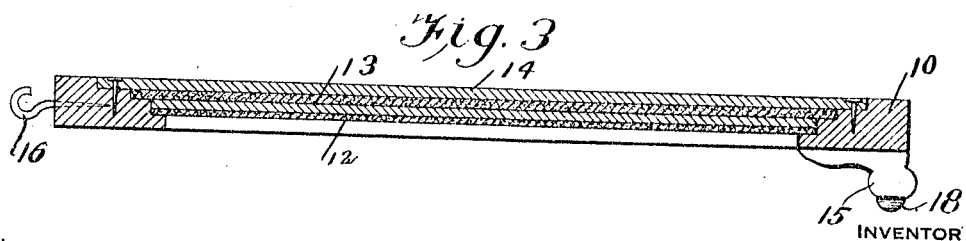
Fig. 3 is a sectional view taken on line 3—3 of Fig. 1.

The article forming the subject matter of my invention embodies a frame 10 preferably constructed from wood, although the material and design of the frame can be varied without departing from the spirit of the invention. As shown in this specific instance the frame is of rectangular outline and has its inner edge beveled in step-like formation to accommodate the remaining elements which go to make up the device.

Arranged upon the lowermost step of the frame is a base board 11 which has its bottom side covered or lined with a heat resisting material, such as asbestos or the like indicated at 12. Superimposed upon this element and resting upon the next lowermost step of the frame is a solid asbestos member 13 of substantially the same area as the base board 11, while covering the member 13 is a sheet of linoleum 14. The linoleum is arranged upon the uppermost step of the frame and is of suitable dimensions to lie flush with the upper surface of the frame, the linoleum being tacked or otherwise secured to the frame, and serving to hold the base board and the asbestos member 13 associated with the frame. A foot rest constructed in accordance with my invention resists the heat radiated from the engine in the direction of the floor of the vehicle, and thus prevents the feet of those occupying the front seat of the vehicle from becoming uncomfortably warm, which at present is a condition resulting in a source of annoyance to those riding in the front seat of a motor vehicle.

Secured to the under side of the frame 10 adjacent one end thereof are blocks 15 constituting feet for supporting the foot rest at an inclination to the comfort of the user, and at the same time spacing the foot rest an appreciable distance from the floor of the car to provide for the circulation of air beneath the foot rest. Projecting laterally from the end of the frame opposite to that carrying the feet 15 are hooks 16 adapted to engage the screw eye 17 secured to the floor of the vehicle, and in this manner the foot rest is prevented from movement relative to an appropriate part of the vehicle. It will be noted that the disposition of the hooks 16 is such that they cannot become casually disengaged from the eyes 17, and that it is necessary to swing the foot rest into a perpendicular position before the hooks can be disengaged from the eyes 17. This however permits of a very quick removal of the foot rest when it is desired to either clean the latter or the floor of the vehicle. The device in its entirety is extremely simple in construction, and can be manufactured and sold at a very small cost.

What is claimed is:—

1. An automobile foot rest comprising a frame open at its center and having the walls of said opening stepped, a plurality of layers of heat insulating material disposed upon the various steps within said frame, the uppermost layer being flush with the top of said frame, and securing members passed through the uppermost layer into said frame.

2. An automobile foot rest comprising a heat insulating pad, securing members on one end of said pad engageable with other securing members carried by the floor of an automobile, and spacing members at the opposite end of said frame whereby said frame will be supported with one end above and in spaced relation to the floor whereby a heat insulating air space will be provided.

In testimony whereof I affix my signature.

MORRIS F. BELL.